United States Patent [19]

DeChellis et al.

[11] Patent Number: 5,405,922

[45] Date of Patent: Apr. 11, 1995

[54] PROCESS FOR POLYMERIZING MONOMERS IN FLUIDIZED BEDS

[75] Inventors: Marc L. DeChellis, Houston; John R. Griffin, Baytown; Michael E. Muhle, Kingwood, all of Tex.

[73] Assignee: Exxon Chemical Patents Inc., Linden, N.J.

[21] Appl. No.: 216,520

[22] Filed: Mar. 22, 1994

Related U.S. Application Data

[63] Continuation of Ser. No. 65,250, May 20, 1993, abandoned.

[51] Int. Cl.$^6$ .............................................. C08F 2/34
[52] U.S. Cl. ........................................ 526/68; 526/67; 526/70; 526/88; 526/160; 526/348.2; 526/348.4; 526/348.5; 526/901
[58] Field of Search ................... 526/67, 68, 70, 88, 526/160, 901

[56] References Cited

U.S. PATENT DOCUMENTS

| | | | |
|---|---|---|---|
| 4,522,987 | 6/1985 | Hogan et al. | 526/106 |
| 4,543,399 | 9/1985 | Jenkins, III et al. | 526/70 |
| 4,564,647 | 1/1986 | Hayashi et al. | 523/211 |
| 4,588,790 | 5/1986 | Jenkins, III et al. | 526/70 |
| 4,937,301 | 6/1990 | Chang | 526/128 |
| 5,032,562 | 7/1991 | Lo et al. | 502/111 |
| 5,032,652 | 7/1991 | Chang | 526/129 |
| 5,100,979 | 5/1992 | Eisinger et al. | 526/88 |
| 5,106,804 | 4/1992 | Bailly et al. | 502/108 |
| 5,106,926 | 4/1992 | Eisinger et al. | 526/88 |
| 5,317,036 | 5/1994 | Brady, III et al. | 523/223 |

FOREIGN PATENT DOCUMENTS

| | | |
|---|---|---|
| 0024933 | 3/1981 | European Pat. Off. . |
| 0089691 | 9/1983 | European Pat. Off. . |
| 0183154 | 4/1986 | European Pat. Off. . |
| 0241947 | 10/1987 | European Pat. Off. . |
| 0277003A1 | 8/1988 | European Pat. Off. . |
| 0277004A1 | 8/1988 | European Pat. Off. . |
| 0323716A1 | 7/1989 | European Pat. Off. . |
| 0447071A1 | 9/1991 | European Pat. Off. . |
| 93/03093 | 2/1993 | WIPO . |

*Primary Examiner*—David W. Wu
*Attorney, Agent, or Firm*—Jaimes Sher

[57] ABSTRACT

The invention is directed toward polymerizing alpha-olefins either alone or in combination with one or more other alpha-olefins utilizing a bulky ligand transition metal catalyst in a gas phase fluidized bed polymerization reactor operating in condensed mode.

34 Claims, No Drawings

५,४०५,९२२

PROCESS FOR POLYMERIZING MONOMERS IN FLUIDIZED BEDS

This is a continuation of application Ser. No. 08/065,250, filed May 20, 1993, now abandoned.

FIELD OF THE INVENTION

The present invention relates to a continuous process for the gas phase polymerization of olefins in a fluidized bed reactor. More particularly, the invention is directed to a gas phase polymerization process for polymerizing monomers in a fluidized bed reactor operating in a condensed mode. The invention is more specifically drawn to a condensed mode gas phase polymerization process utilizing as the catalyst a bulky ligand transition metal compound.

BACKGROUND OF THE INVENTION

It is widely known that gas phase fluidized bed polymerization processes produce a diverse array of polymers. In such a process a continuous cycle is employed where in one part of the cycle, a cycling gas stream, otherwise known as a recycle stream or fluidizing medium, is heated in the reactor by the heat of polymerization. This heat is removed in another part of the cycle by a cooling system external to the reactor.

Generally in a gas fluidized bed process for producing polymer from monomers a gaseous stream containing one or more monomers is continuously cycled through a fluidized bed in the presence of a catalyst under reactive conditions. This gaseous stream is withdrawn from the fluidized bed and recycled back into the reactor. Simultaneously, polymer product is withdrawn from the reactor and new or fresh monomer is added to replace the polymerized monomer.

Conventionally in the past the temperature of the recycle stream entering the reactor could not be decreased below the dew point of the recycle stream. The dew point of the recycle stream is that temperature at which liquid condensate begins to form in the gaseous recycle stream. Later it was demonstrated as disclosed in U.S. Pat. Nos. 4,543,399 and 4,588,790 to Jenkins, III, et al. that a recycle stream can be cooled to a temperature below the dew point in a fluidized bed polymerization process resulting in condensing a portion of the recycle stream. The resulting recycle stream containing entrained liquid is then returned to the reactor. U.S. Pat. Nos. 4,543,399 and 4,588,790 to Jenkins, III, et al. are herein fully incorporated by reference. For the purposes of this patent application the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

The catalyst system described in Jenkins, III, et al. is a TiCl$_3$ based traditional Ziegler-Natta catalyst system. Using this catalyst system in a condensed mode operation results inevitably in process and product constraints as will become apparent later in this specification. The process limitations limit production rates and significantly increase the cost of producing polymers. Also, as a direct consequence of using these traditional catalysts in this process the polymers available for production are restricted to certain densities and melt indices.

Polymer production rates and characteristics can be controlled to give a desired melt index and density in a gas phase fluidized bed reactor. In operation of a gas phase fluidized bed reactor, the process is a closed system. Changes in the process of one or more reactor conditions can lead to consequential changes elsewhere in the system. Therefore, great care is taken to avoid conditions which lead to chunking, sheeting, fluidized bed collapse, reaction termination and reactor shutdown. There are target values, determined by the polymer to be produced and the catalyst, for the operating temperature, the ratio of comonomer(s) to monomer and the ratio of hydrogen to monomer. Traditional catalyst systems and polymer produced therewith restrict these values, and as a direct consequence of this, drastically reduce production rates achievable for any given polymer being produced. Furthermore, these traditional catalysts and catalyst systems limit the type and characteristics of the polymer.

Therefore a need exists for a gas phase polymerization process that allows for the extension of the target values heretofore limited. Extending these values beyond that which was achievable in the past will allow for the operation of a gas phase fluidized bed polymerization reactor at significantly higher production rates and of the production of polymer grades at a significantly reduced cost not heretofore envisaged.

SUMMARY OF THE INVENTION

This invention relates to a continuous gas phase polymerization process for polymerizing alpha-olefins utilizing a bulky ligand transition metal catalyst, for example a metallocene, in a gas phase fluidized bed reactor operating in a condensed mode.

This invention in another embodiment relates to a continuous process for the polymerization of alpha-olefin monomer and at least one copolymerizable alpha-olefin comonomer in a gas phase fluidized bed reactor. A recycle stream is passed through the reactor such that the recycle stream comprises a ratio of $(C_x+H_2)/C_y$ of less than about 0.2, a dew point increasing component in an amount greater than about 2.0 mole percent and non-condensable inerts making up the balance of the recycle stream, where $C_x$, $H_2$ and $C_y$ are the mole percent respectively of comonomer, hydrogen and monomer. A catalyst is introduced under reactive conditions into the reactor to polymerize the recycle stream into a polymer product that is withdrawn from the reactor. The recycle stream containing unreacted monomers is also withdrawn from the reactor and additional monomers are introduced into the recycle stream to replace monomers polymerized so as to maintain the ratio of the recycle stream. In the preferred embodiment the recycle stream is compressed and/or cooled to form a liquid phase and a gas phase, which are reintroduced into the reactor.

In a preferred embodiment that alpha-olefin monomer is ethylene. In another preferred embodiment the comonomer is a $C_5$ or a higher alpha-olefin.

It is the an object of this invention to provide a process for polymerizing olefins in a gas fluidized bed polymerization reactor at significantly higher production rates. It is a related object of this invention to provide a process that results in the increased cooling capability of a recycle stream. It is further related object of this invention to provide a polymerization process for producing polymers having a broader range of densities and melt indices. It is yet another object of this invention to provide a polymerization process that provides for even greater savings in energy, raw materials and capital expenditure.

DETAILED DESCRIPTION OF THE INVENTION

This invention relates to the gas phase polymerization process for polymerizing olefins utilizing a metallocene in a gas phase fluidized bed polymerization reactor operating in a condensed mode. The invention provides for a significant increase in the production rate of polymer produced in a gas phase fluidized bed reactor. The invention further provides for the production of a broad range of polymers having improved characteristics at these significantly higher production rates.

This invention is directed toward the gas phase polymerization or copolymerization reactions involving the polymerization of one or more of the alpha-olefin monomers having from 2 to 20 carbon atoms, preferably 2-15 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. Preferably a copolymer of ethylene is produced such that the amount of ethylene and comonomer is adjusted to produce a desired polymer product. Preferably the comonomer is an alpha-olefin having from 4 to 15 carbon atoms, more preferably 5 to 12 carbon atoms and most preferably 5 to 10 carbon atoms. In another embodiment ethylene is polymerized with at least two comonomers to form a terpolymer and the like.

The catalyst useful in the polymerization process of this invention are generally in the field of transition metal catalysis, which includes many transition metals of metallo-organic nature. Over the past few years a new catalyst technology has developed, which provides for the modification and/or control over the properties and characteristics of a polymer. This technology principally involves the use of single-site catalysts to produce a broad range of polymers generally having a narrow molecular weight distribution and a narrow composition distribution. The art has focused on the type of catalyst and catalyst system employed and product attributes produced therefrom, however, the surprising and unexpected benefits derived from these catalysts in a condensed mode gas phase polymerization process have gone unrecognized until now.

Selected metallo-organic catalysts and catalyst systems are suitable to produce polymer from selected gas compositions entering the reactor as the recycle stream. With reference to the catalyst, it is preferably a bulky ligand transition metal catalyst. The bulky ligand contains a multiplicity of bonded atoms, preferably carbon atoms, forming a group which may be cyclic with one or more optional heteroatoms. The bulky ligand may be a cyclopentadienyl derivative which can be mono- or poly-nuclear. One or more bulky ligands may be bonded to the transition metal atom. The transition metal atom is a Group IV, V or VI transition metal of the Periodic Table of Elements. Other ligands may be bonded to the transition metal, preferably detachable by a cocatalyst such as a hydrocarbyl or halogen leaving group. The catalyst is derivable from a compound represented by the formula:

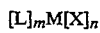

wherein L is the bulky ligand; X is the leaving group, M is the transition metal and m and n are such that the total ligand valency corresponds to the transition metal valency. Preferably the catalyst is four co-ordinate such that the compound is ionizable to a 1+ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

Certain types of metallocenes possess the necessary properties for the process of this invention. For the purposes of this patent specification the term "metallocene" is herein defined to contain one or more cyclopentadienyl moiety in combination with a transition metal of the Periodic Table of Elements. The metallocene catalyst component is represented by the general formula $(C_p)_m MR_n R'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1-20 carbon atoms; m=1-3, n=0-3, p=0-3, and the sum of m+n+p equals the oxidation state of M. Various forms of the catalyst system of the metallocene type may be used in the polymerization process of this invention. Exemplary of the development of these metallocene catalysts for the polymerization of ethylene is found in the disclosure of U.S. Pat. No. 4,937,299 to Ewen, et al. and EP-A-0 129 368 published Jul. 26, 1989, both of which have been fully incorporated herein by reference. These publications teach the structure of the metallocene catalysts and includes alumoxane as the cocatalyst. There are a variety of methods for preparing alumoxane of which one described in U.S. Pat. No. 4,665,208. Other cocatalysts may be used with metallocenes, such as trialkylaluminum compounds; or ionizing ionic activators or compounds such as, tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0 277 003 and EP-A-0 277 004 both published Aug. 3, 1988 and are both herein fully incorporated by reference. Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257 all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr.

29, 1993 all of which are herein incorporated by reference. All the catalyst systems described above may be, optionally, prepolymerized or used in conjunction with an additive or scavenging component to enhance catalytic productivity.

Metallocenes selected to have a combination of good comonomer incorporation, hydrogen sensitivity and polymerization activity are preferred. The preferred metallocenes are those having two or more substituents on at least one cyclopentadienyl group such as the mono- or bis-substituted cyclopentadienyl zirconocenes, specifically, bis (1-methyl, 3-n-butyl cyclopentadienyl)zirconium dichloride. Metallocene catalysts that are excessively hydrogen sensitive or generate hydrogen may restrict the process to the making of high melt index materials. Too low an activity leads to high ash levels and necessitates the use of higher levels of stabilizers. Too high an activity could induce fouling. Too poor a comonomer incorporation may impact on the range of low density materials capable of being produced. A wide product range can be obtained by adjusting the feed gas stream or recycle stream composition for a particular metallocene. Mixtures of two or more different metallocenes can also be used.

The catalyst may be supported on a suitable particulate material such as polymeric supports or inorganic oxide such as silica, alumina or both. Methods of supporting the catalyst of this invention are described in U.S. Pat. Nos. 4,808,561, 4,897,455, 4,937,301, 4,937,217, 4,912,075, 5,008,228, 5,086,025 and 5,147,949 and U.S. application Ser. Nos. 898,255, filed Jun. 15, 1992, now U.S. Pat. No. 5,238,892, and 885,170, filed May 18, 1992, now U.S. Pat. No. 5,240,894, all of which are herein incorporated by reference. The preferred support method is generally disclosed in U.S. Pat. No. 4,937,301 and related U.S. patents which are listed above.

Depending on how well the catalyst incorporates comonomer certain levels of comonomer may yield certain levels of polymer density. For example, highly incorporating catalyst can produce a low density polymer with a low level of comonomer. Similarly, depending on how the catalyst responds to hydrogen, certain levels of melt indices may be obtained. For the preferred alpha-olefin monomer ethylene, depending on the catalyst, the $C_x/C_2$ ratios are preferably less than about 0.2, and more preferably less than about 0.1, and as low as about 0.02 to provide a polymer having a density in the range of from about 0.86 g/cm$^3$ to about 0.96 g/cm$^3$, preferably about 0.88 g/cm$^3$ to about 0.94 g/cm$^3$ and most preferably between about 0.90 g/cm$^3$ to about 0.935 g/cm$^3$.

The advantages and benefits derived from this invention are equally seen in the polymers produced by this invention having a melt index of at least about 0.05 dg/min and less than about 1000 dg/min, preferably less than 100 dg/min.

Ethylene is the preferred monomer and depending on the catalyst, the $H_2/C_2$ ratios are less than about 10,000 ppm, preferably less than about 5000 ppm and even more preferably less than about 1000 ppm and most preferably less than about 500 ppm to give a polymer with a melt index in the range of from about 0.05 dg/min to about 1000 dg/min, preferably about 0.05 dg/min to about 100 dg/min, more preferably greater than about 0.1 dg/min and most preferably greater than about 0.5 dg/min.

The reactivity ratios of the catalysts and catalyst systems of this invention are generally less than about 2, preferably less than about 1. Reactivity ratio is defined to be the mole ratio of comonomer to monomer in the recycle stream ($C_x/C_y$) divided by the mole ratio of comonomer to monomer ($C_x/C_y$) in the polymer produced, where $C_x$ is the mole percent of comonomer and $C_y$ is the mole percent of the monomer. The catalyst useful in this invention should preferably have a productivity of over 2000 grams of polymer per gram catalyst, preferably about 3000 grams of polymer per gram catalyst and most preferably greater than about 3500 grams of polymer per gram catalyst. The productivity is influenced by the ethylene partial pressure. The preferred mole percent of ethylene is from about 25 to about 75 mole percent and the monomer partial pressure is in the range of from about 75 psia (517 kPaa) to about 240 psia (1655 kPaa). It is desirable that the catalyst combines the monomers efficiently to provide a low ash level.

In the preferred embodiment, composition of the recycle stream, used to fluidize the bed in the reactor, is maintained at a ratio of $(C_x+H_2)/C_y$ of less than about 0.2, preferably less than about 0.1, where $C_x$, $H_2$ and $C_y$ are the mole percent respectively of the comonomer, the hydrogen and the alpha-olefin monomer. The recycle stream also contains in the range of from about 2.0 to about 6.0 mole percent, preferably at least about 2.5 mole percent and preferably greater than about 5.0 mole percent of a dew point increasing component, not exceeding an amount which would disrupt fluidization. In the preferred embodiment the balance of the feed stream is made up of non-condensable inerts for example, nitrogen ($N_2$). The preferred alpha-olefin is ethylene and the preferred comonomers are pentene-1, hexene-1 or octene-1.

By the combination of the catalyst and the recycle stream composition described above high reactor productivities become possible for lower density or higher melt index copolymers. The process of this invention requires significantly less comonomer and hydrogen and permits greater cooling by the recycle stream. The higher production rates result from the improved cooling capability or capacity of the recycle stream with the above described recycle stream compositions of the process of this invention. This relates to the increased gas density of the recycle stream and to the higher specific enthalpy change of the stream also referred to as the enthalpy change from the inlet to the reactor conditions.

The closer the dew point gets to the reactor temperature the likelihood of the polymers sticking together is substantially higher. Sticking can also be caused by the fusing of the polymer particles at too high reactor temperatures. As a result of polymer sticking together fluidization instabilities can occur. This may cause chunking and downstream activities, extrusion and the like, may become more difficult. There is generally no accepted view as to what precisely causes chunking or sheeting. Obviously some fusing together of the polymer particles is involved, possibly because of insufficient heat transfer caused by inadequate fluidization in the fluidized bed. However, no clear correlations have thus far been found between individual process settings and measurements and the occurrence of chunking and sheeting. However, in the preferred embodiment it is best to maintain greater than at least about 5° F. (2.8° C.), more preferably in the preferred embodiment at least about 10° F. (5.6° C.), temperature differential between the dew point temperature and the reactor temperature.

Also, a broader density and melt index range of polymer may be produced in an efficient and cost effective manner as a direct result of reduced comonomer in the process of this invention.

Using the process of the invention relatively high reactor temperatures may be used benefiting the catalyst activity as well as increasing the reactor productivity by higher levels of cooling. The combination of lower comonomer levels, lower amounts of polymerization reactants overall, and high reactor temperatures can help achieve significant improvements in the process.

The higher reactor temperatures are believed to be associated with lower stickiness of the polymer particles in the fluidized bed arising from lower levels of low molecular weight amorphous materials and lower levels of dissolved comonomer in the polymer. Lower stickiness improves resin flow ability which also benefits downstream handling.

Preferably, the catalyst selection should provide hexane extractability less than about 2 wt %, preferably less than about 1 wt %. Hexane extractables can be determined in detail by referring to 21 CFR 177.1520 (d)(3)(ii). The catalyst selection is preferably such that the composition distribution breadth index (CDBI) of the polymer produced is over 50%, preferably over 60%, most preferably in the range of 60% to about 80%. CDBI, its measurement and calculation, is explained in detail in PCT patent application WO 93/03093 published Feb. 18, 1993. Essentially CDBI is a measure of compositional distribution. CDBI is defined as the weight percent of copolymer molecules having a comonomer content within 50% (that is, 25% on each side) of the median total molar comonomer content.

The lower stickiness is also reflected in the improved ability of this process to make high melt index or low density polymers. Also, because of the lower stickiness the reactor temperature can be significantly increased above that achievable in the past such that the even further cooling capabilities are achievable.

The term "dew point increasing component" is used herein to exclude polymerizable monomers, including those which raise the dew point. For the purposes of this patent specification the term "dew point increasing component" includes saturated or non-polymerizable unsaturated hydrocarbons. Examples of suitable dew point increasing components are readily volatile liquid hydrocarbons, which may be selected from saturated hydrocarbons containing from 3 to 10 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. The preferred hydrocarbons are $C_4$ to $C_6$ saturated hydrocarbons. The preferred dew point increasing components are pentanes. Preferably, the stream contains from about 5 to about 60 mole percent of a dew point increasing component, preferably with the component having one carbon atom less than the comonomer or at least one carbon atom less than the comonomer. This may assist in achieving high reactor productivities. The dew point itself is calculated from the feed gas composition as analyzed for example by gas chromatography. In combination with actual recycle gas temperatures and pressures, the weight percent of condensed liquid in the recycle stream is also calculated.

The preferred method for measuring fluidized bed stability is by monitoring the fluidized bulk density, pressure measurements along the upper part of the fluidized bed or detecting formation of chunks in the reactor. Fluidized bed stability is influenced by but difficult to link with particular operating conditions. Generally operating temperatures should be below the melting point and below the temperature at which the particles become sticky as explained previously. Using the invention it is believed that high reactor temperatures can be maintained at low densities, high melt index, with higher olefin comonomers and high levels of dew point raising components. In the preferred embodiment, it is important that no more condensable components should be added which would raise the dew point to such a level that the evaporation inside the reactor becomes incomplete.

In practice of the process of this invention the weight percent of liquid in the recycle stream based on the total weight of the recycle stream is in the range of about 2 to about 50 weight percent, preferably greater than about 10 weight percent, and more preferably greater than about 15 weight percent and even more preferably greater than 20 weight percent and most preferable in the range between about 25 to about 40 weight percent.

In one preferred embodiment of this present invention, the entry point for the recycle stream is preferably below the fluidized bed so as to provide a uniform flow of the recycle stream to maintain the fluidized bed in a suspended condition and to ensure uniformity of the recycle stream passing upwardly throughout the fluidized bed. In another embodiment of the present invention, the recycle stream can be divided into two or more separate streams, one or more of which can be introduced directly into the fluidized bed provided that the gas velocity below and through the fluidized bed is sufficient to keep the bed suspended. For example, the recycle stream can be divided into a liquid and a gas stream which can then be separately introduced into the reactor.

The reactor pressure may vary from about 100 psig (689.7 kPag) to about 500 psig (3448.3 kPag), preferably in the range of about 200 psig (1379.3 kPag) to about 400 psig (2758.6 kPag) and most preferably in the range of about 250 psig (1724.1 kPag) to about 350 psig (2413.8 kPag). Increasing catalyst activities combined with good comonomer incorporation and hydrogen sensitivity may enable lowering of the pressure overall or of the ethylene partial pressure. Typically reactor temperatures are in the range of about 130° F. (54.4° C.) to about 250° F. (121.1° C.), preferably in the range of about 140° F. (60° C.) to about 220° F. (104.4° C.), more preferably in the range of about 145° F. (62.7° C.) to about 215° F. (101.7° C.), even more preferably in the range of about 155° F. (68.3° C.) to about 200° F. (93.3° C.) and most preferably in the range of about 165° F. (73.9° C.) to about 185° F. (85° C.). The superficial gas velocity of the gas flow through the reactor generally exceeds the minimum flow required for fluidization which is typically from about 0.2 ft/sec (0.061 m/s) to 0.5 ft/sec (0.153 m/s). Preferably, the superficial gas velocity is maintained not less than about 0.7 ft/sec (0.214 m/s), and even more preferably not less than 1.0 ft/sec (0.305 m/s). The superficial gas velocity should preferably not exceed 5.0 ft/sec (1.5 m/s).

EXAMPLES

In order to provide a better understanding of the present invention including representative advantages and limitations thereof, the following examples are offered.

EXAMPLE 1

In the examples different catalysts are used. For the actual comparative run C-1 and extrapolated data run C-1A of Table 1 a titanium based catalyst is used similar to that in U.S. Pat. No. 4,543,399. The catalyst used is a complex of tetrahydrofuran, magnesium chloride and titanium chloride reduced with diethyl aluminum chloride (diethyl aluminum chloride-to-tetrahydrofuran molar ratio of 0.42) and tri-n-hexyl aluminum (tri-n-hexyl aluminum-to-tetrahydrofuran molar ratio of 0.28) impregnated on triethyl aluminum treated silicon dioxide. The activator is triethyl aluminum (TEAL).

For the actual runs 2A and 8A of Table 3 and extrapolated data runs 2–6 of Table 1, runs 8–13 of Table 2 and runs 14–18 of Table 4 the catalyst was based on a metallocene with a di-substituted cyclopentadienyl rings as follows:

To a clean, dry $N_2$ mixer were added 800 grams of silica dehydrated at 200° C. with an LOI (OH content) of approximately 3 wt %. 2000 ml of toluene is rapidly added to the vessel. 1060 ml of 30 wt % MAO based on the Al-content is added to the vessel while mixing. The jacket temperature is increased such that the internal temperature is 155° F. The mixture is held at this temperature for 4 hours while mixing. Then there is added rapidly to the reactor with mixing, 23 grams of bis(1-methyl, 3-n-butyl Cp)$ZrCl_2$ dissolved in approximately 500 ml of toluene. The reactor temperature is again held at 155° F. for 1 hour while continuing mixing. Finally the catalyst solids are dried with nitrogen under vacuum at 155° F. until the solids are free-flowing and have a volatile content of 10 wt % or less.

The catalyst for actual run 7A of Table 3 and extrapolated data run 7 of Table 1 was prepared as follows:

All steps are performed in a dry box using dry, degassed solvents. Accordingly there is added to a clean, dry, 1 liter round bottom flask 300 ml of a 25 wt % solution of triethyl aluminum in heptane. 300 g of silica dehydrated at 800° C. is added over a period of 15 minutes while stirring. The silica is Davison 948. The solvent is then removed in vacuo to obtain a free flowing solid. 12.0 g of tetrakis perfluorophenyl boron dimethylanilinium salt is then dissolved in 800 ml of hot (100° C.) toluene in a 2 liter round bottom flask while stirring. This is added via a cannula to a 3 liter round bottom flask containing 300 g TEAL treated silica as obtained above slurried with a mechanical overhead stirrer in 500 ml of hot (100° C.) toluene. The mixture is allowed to cool to room temperature and 1200 ml of pentane is added while stirring with a mechanical overhead stirrer. The solvent is decanted and residual solvent removed in vacuo to obtain a free flowing solid. The supported activator prepared above is then slurried in 500 ml pentane, then 5.43 g of bis(n-butylcyclopentadienyl) dimethyl zirconium is added, dissolved in 200 ml pentane. The solvent is decanted and residual solvent is removed in vacuo to obtain a free flowing solid.

Runs C-1 of Table 1 and 2A, 7A and 8A of Table 3 are based on actual tests. The data shown by runs C-1A, 2, 3, 4, 5, 6 and 7 of Table 1, runs 8–13 of Table 2 and runs 14–18 of Table 4 were prepared by extrapolating information from actual operations by using thermodynamic equations well known in the art to project actual conditions and production rates. Each run is explained below:

TABLE I

| RUN | C-1 | C-1A | 2 | 3 | 4 | 5 | 6 | 7 |
|---|---|---|---|---|---|---|---|---|
| MI (dg/min) | 3.39 | 3.39 | 1.61 | 1.61 | 1.61 | 1.61 | 1.61 | 18.7 |
| Density (g/cm$^3$) | 0.9168 | 0.9168 | 0.9175 | 0.9175 | 0,9175 | 0.9175 | 0.9175 | 0.9222 |
| Temp (°C.) | 78.9 | 78.9 | 78.9 | 78.9 | 78.9 | 78.9 | 78.9 | 79.4 |
| Temp (°F.) | 174 | 174 | 174 | 174 | 174 | 174 | 174 | 175 |
| Pressure (kPag) | 2110 | 2110 | 2110 | 2110 | 2110 | 2110 | 2110 | 2110 |
| Pressure (psig) | 306 | 306 | 306 | 306 | 306 | 306 | 306 | 306 |
| $C_2$ Pressure (kPaa) | 719 | 719 | 881 | 881 | 881 | 881 | 881 | 665 |
| $C_2$ Pressure (psia) | 104.2 | 104.2 | 127.7 | 127.7 | 127.7 | 127.7 | 127.7 | 96.4 |
| Comonomer | Hexene | Hexene | Hexene | Hexene | Hexene | Hexene | Hexene | Hexene |
| Cx/C2 | 0.132 | 0.132 | 0.0157 | 0.0157 | 0.0157 | 0.0157 | 0.0157 | 0.0152 |
| H2/C2 | | | | | | | | |
| mole/mole | 0.364 | 0.364 | — | — | — | — | — | — |
| mole ppm/mole | — | — | 2.4 | 2.4 | 2.4 | 2.4 | 2.4 | 3.95 |
| Ethylene (mole %) | 32.5 | 32.5 | 39.8 | 39.8 | 39.8 | 39.8 | 39.8 | 30.1 |
| iC5 (mole %) | 1.0 | 10.3 | 1.6 | 8.5 | 11 | 13.5 | 21.1 | 14 |
| H2 (mole %) | 11.8 | 11.8 | 0.010 | 0.010 | 0.010 | 0.010 | 0.010 | 0.012 |
| N2 (mole %) | 48.6 | 39.5 | 56.9 | 50.1 | 47.6 | 45.1 | 37.6 | 54.3 |
| Cx (mol %) | 4.3 | 4.3 | 0.6 | 0.6 | 0.6 | 0.6 | 0.6 | 0.5 |
| Prod Rate (lb/hr) | 57400 | 95500 | 30500 | 50000 | 65000 | 80000 | 131400 | 80000 |
| Prod Rate (tons/hr) | 26.1 | 43.2 | 13.9 | 22.7 | 30.0 | 36.4 | 59.7 | 36.4 |
| % Condensed | 11.6 | 23.05 | 0.00 | 4.70 | 10.20 | 15.47 | 30.59 | 15.66 |
| T inlet (°C.) | 40.4 | 40.6 | 40.4 | 40.6 | 40.5 | 40.7 | 40.6 | 40.4 |
| T Inlet (°F.) | 104.8 | 105.0 | 104.8 | 105.0 | 104.9 | 105.3 | 105.0 | 104.8 |
| T dew (°C.) | 64.3 | 73.3 | 18.4 | 46.9 | 53.7 | 59.4 | 73.4 | 59.4 |
| T dew (°F.) | 147.7 | 164.0 | 65.1 | 116.4 | 128.6 | 139.0 | 164.2 | 139.0 |
| Gas Velocity (ft/sec) | 2.33 | 2.33 | 2.33 | 2.33 | 2.33 | 2.33 | 2.33 | 2.33 |
| Gas Velocity (m/sec) | 0.71 | 0.71 | 0.71 | 0.71 | 0.71 | 0.71 | 0.71 | 0.71 |
| Catalyst Productivity g PE per g Cat | 3500 | 3500 | 3850 | 3850 | 3850 | 3850 | 3850 | 3490 |
| Gas Density (lb/ft$^3$) | 1.32 | 1.57 | 1.37 | 1.57 | 1.64 | 1.71 | 1.93 | 1.70 |
| Gas Density (kg/m$^3$) | 21.1 | 25.1 | 22.0 | 25.1 | 26.3 | 27.4 | 30.9 | 27.2 |
| Spec. Enthalpy (Btu/lb) | 45.7 | 64.6 | 23.5 | 34.0 | 42.4 | 50.3 | 73.5 | 50.6 |
| Spec. Enthalpy (Cal/g) | 25.4 | 35.9 | 13.0 | 18.9 | 23.6 | 27.9 | 40.8 | 28.1 |

Run C-1

Run C-1 of Table 1 is actual plant data in which substantially the same process and catalyst systems as disclosed in U.S. Pat. Nos. 4,543,399 and 4,588,790.

Run C-1A

Run C-1A of Table 1 contains data extrapolated from run C-1 above. This run illustrates for this particular grade material the preferred dew point limit is reached. That is the difference between the reactor temperature and the dew point temperature is about 10° F. (5.6° C.). At this point increasing the dew point to approach reactor temperature any further may result in instabilities in the fluidized bed, possibly sheeting and chunking as a result.

Run 2 and 2A

Run 2 of Table 1 contains data extrapolated from run 2A of Table 3. Run 2A is actual pilot plant data. Run 2 illustrates this data when scaled up to the reactor used in run C-1. The catalyst used is as described previously.

As one can see the $C_x/C_2$ and $H_2/C_2$ ratios are extremely low as compared with runs C-1 and C-1A.

Runs 3–6

Runs 3–6 illustrate extrapolated data where the level of dew point increasing component, in this particular example, isopentane (i—$C_5$) is used, is increased within the recycle stream composition. The amount of i—$C_5$ increases from 1.6 mole % in run 2 to 21.1 mole % in run 6. In so doing the dew point steadily increases such that the dew point limit of 10° F. (5.6° C.) is reached while the production rate for the same polymer grade is dramatically increased. This figure is well above the limit of run C-1A. Note that the reactor and inlet temperature, pressure and gas velocity remain constant. Also note that the gas densities are much higher for the runs illustrating the process of this invention as are the cycle gas enthalpy changes. If the reactor temperature were raised to 185° F. (85° C.) and the dew point raised to 174.7° F. (79.3° C.), a further increase in production rate up to 167,000 lb/hr (76.0 tons/hr) could be obtained.

Runs 7 and 7A

Run 7 of Table 1 contains data extrapolated from actual pilot plant run data shown in run 7A of Table 3. The catalyst system has been changed as described previously. As the results show, the increases in production rate are achievable with different metallocene catalyst systems.

TABLE 2

| RUN | 8 | 9 | 10 | 11 | 12 | 13 |
|---|---|---|---|---|---|---|
| MI (dg/min) | 1.05 | 1.05 | 1.05 | 1.05 | 1.05 | 1.05 |
| Density (g/cm³) | 0.918 | 0.918 | 0.918 | 0.918 | 0.918 | 0.918 |
| Temp (°C.) | 78.9 | 78.9 | 78.9 | 78.9 | 78.9 | 78.9 |
| Temp (°F.) | 174 | 174 | 174 | 174 | 174 | 174 |
| Pressure (kPag) | 2069 | 2069 | 2069 | 2069 | 2069 | 2069 |
| Pressure (psig) | 300 | 300 | 300 | 300 | 300 | 300 |
| $C_2$ Pressure (kPaa) | 1090 | 1090 | 1090 | 1090 | 1090 | 870 |
| $C_2$ Pressure (psia) | 158.1 | 158.1 | 158.1 | 158.1 | 158.1 | 126.2 |
| Comonomer | Octene | Octene | Octene | Octene | Octene | Octene |
| $C_x/C_2$ | 0.009 | 0.009 | 0.009 | 0.009 | 0.009 | 0.009 |
| $H_2/C_2$ mole/mole | — | — | — | — | — | — |
| mole ppm/mole | 2.00 | 2.00 | 2.00 | 2.00 | 2.00 | 2.00 |
| Ethylene (mole %) | 50.2 | 50.2 | 50.2 | 50.2 | 50.2 | 40.1 |
| iC5 (mole %) | 1 | 7.5 | 10.5 | 13 | 16 | 17.5 |
| H2 (mole %) | 0.010 | 0.010 | 0.010 | 0.010 | 0.010 | 0.008 |
| N2 (mole %) | 47.4 | 41.0 | 38.0 | 35.5 | 32.6 | 41.1 |
| Cx (mol %) | 0.5 | 0.5 | 0.5 | 0.5 | 0.5 | 0.4 |
| Prod Rate (lb/hr) | 37400 | 50600 | 63800 | 79200 | 96800 | 103400 |
| Prod Rate (tons/hr) | 16.8 | 23.0 | 29.0 | 36.0 | 44.0 | 47.0 |
| % Cond | 1.10 | 4.94 | 9.89 | 15.24 | 21.14 | 23.28 |
| T Inlet (°C.) | 40.1 | 40.8 | 40.9 | 40.4 | 40.9 | 40.6 |
| T Inlet (°F.) | 104.1 | 105.5 | 105.7 | 104.8 | 105.6 | 105.1 |
| T dew (°C.) | 49.9 | 60.8 | 65.4 | 69.2 | 73.4 | 73.5 |
| T dew (°F.) | 121.9 | 141.4 | 149.8 | 156.5 | 164.1 | 164.3 |
| Gas Velocity (ft/sec) | 2.33 | 2.33 | 2.33 | 2.33 | 2.33 | 2.33 |
| Gas Velocity (m/sec) | 0.71 | 0.71 | 0.71 | 0.71 | 0.71 | 0.71 |
| Cat Activity gPE per g cat | 3630 | 3630 | 3630 | 3630 | 3630 | 2900 |
| Gas Density (lb/ft³) | 1.34 | 1.54 | 1.62 | 1.68 | 1.77 | 1.78 |
| Gas Density (Kg/m³) | 21.4 | 24.6 | 25.9 | 27.0 | 28.4 | 28.6 |
| Spec. Enthalpy (Btu/lb) | 29.8 | 35.3 | 42.5 | 50.7 | 59.1 | 62.7 |
| Spec. Enthalpy (cal/g) | 16.6 | 19.6 | 23.6 | 28.2 | 32.8 | 34.8 |

Runs 8–13

Run 8 contains data extrapolated from the actual pilot plant data shown in run 8A of Table 3. The catalyst system used is the same as used in runs 2–6 of Table 1. However, the comonomer for runs 8A and 8–13 is octene-1.

Again, as the amount of the dew point increasing component increased the production rate is increased steadily such that at the preferred dew point limit the rate of production is 103,400 lb/hr (47.0 tons/hr).

TABLE 3

| RUN | 2A | 7A | 8A |
|---|---|---|---|
| REACTOR PROPERTIES | | | |
| Melt Index (dg/min) | 1.61 | 18.7 | 1.05 |
| Density (g/cm³) | 0.9175 | 0.9222 | 0.9180 |
| MIR | 18.8 | 20.2 | 18.1 |
| PHYSICAL PROPERTIES | | | |
| Bulk Density (lb/ft³) | 29.8 | 24.6 | 29.1 |
| Bulk Density (kg/m³) | 477 | 394 | 466 |
| Avg Particle Size (Inch) | 0.0281 | 0.0331 | 0.0308 |
| Avg Particle Size (cm) | | | |
| Fines (%) thru 120 mesh | 0.15 | 1.14 | 0.58 |
| Ash (ppm) | 243 | 343 | 186 |
| REACTOR CONCENTRATIONS | | | |
| Ethylene (mole %) | 39.8 | 30.05 | 50.2 |
| Octene (mole %) | — | — | 0.452 |
| Hexene (mole %) | 0.62 | 0.46 | — |
| Hydrogen (mole %) | 0.0096 | 0.0118 | 0.0100 |
| Nitrogen (mole %) | 58.7 | 68.1 | 47.8 |
| C6/C2 Mole Ratio | 0.0157 | 0.0152 | — |
| C8/C2 Mole Ratio | — | — | 0.0090 |
| H2/C2 Mole Ratio | 0.00024 | 0.00039 | 0.00020 |
| TEAL (ppm) | 78 | 38 | 78 |
| REACTOR CONDITIONS | | | |
| Production Rate (lb/hr) | 59.8 | 43.8 | 57.0 |
| Production Rate (kg/hr) | 27.2 | 19.9 | 25.9 |
| Reactor Temp (°C.) | 78.7 | 79.7 | 78.9 |
| Reactor Temp (°F.) | 173.6 | 175.4 | 174.1 |

TABLE 3-continued

| RUN | 2A | 7A | 8A |
| --- | --- | --- | --- |
| Catalyst Prod (Lb/Lb) (Kg/Kg) | 3850 | 3490 | 3630 |
| Bed Weight (Kg) | 140 | 122 | 108 |
| Bed Weight (lb) | 307 | 268 | 237 |
| Reactor Res Time (hr) | 5.1 | 6.1 | 4.1 |
| Gas Velocity (m/sec) | 0.51 | 0.52 | 0.52 |
| Gas Velocity (ft/sec) | 1.67 | 1.7 | 1.7 |
| Pressure (kPag) | 2069 | 2069 | 2069 |
| Pressure (psig) | 300 | 300 | 300 |

The range of polymers which have in the past been so obtained is limited. At a density below about 0.910 g/cm$^3$ the polymer granules in the reactor become sticky and the reactor temperatures may have to be lowered, the same can be said for polymer granules at a density greater than 0.910 g/cm$^3$ and a melt index greater than about 100 dg/min, preferably greater than 200 dg/min, even further limiting the scope for adding a dew point increasing component thus, resulting in decreased reactor production rates. Of course one could lower the ethylene partial pressure to compensate for this but then the catalyst activity is lowered by the effect of lower ethylene partial pressures. Similar constraints are encountered when seeking to raise the melt index.

EXAMPLE 2

Now referring to Table 4, extrapolated data for runs 14–18. The same catalyst and setup was used as for run 2 of Example 1. This example illustrates the effect of a particular dew point increasing component. Different components were used to raise the dew point to 10° F. (5.6° C.) below the reactor temperature. The cooling capacity of the recycle stream and reactor productivity were then compared. It can be seen that the lower molecular weight condensable hydrocarbons tend to permit higher reactor production rates. This may also be coupled with lower solubility in the polymer particles of these hydrocarbons and less effect on the polymer melting point which could impact on the fluidized bed stability at a high reactor operating temperature.

TABLE 4

| Run | 14 | 15 | 16 | 17 | 18 |
| --- | --- | --- | --- | --- | --- |
| MI (dg/min) | 1.61 | 1.61 | 1.61 | 1.61 | 1.61 |
| Density (g/cm$^3$) | 0.9175 | 0.9175 | 0.9175 | 0.9175 | 0.9175 |
| Temp (°C.) | 78.9 | 78.9 | 78.9 | 78.9 | 78.9 |
| Temp (°F.) | 174 | 174 | 174 | 174 | 174 |
| Pressure (kPag) | 2110 | 2110 | 2110 | 2110 | 2110 |
| Pressure (psig) | 306 | 306 | 306 | 306 | 306 |
| C$_2$ Pressure (kPaa) | 881 | 881 | 881 | 881 | 881 |
| C$_2$ Pressure (psia) | 127.7 | 127.7 | 127.7 | 127.7 | 127.7 |
| Comonomer | Hexene | Hexene | Hexene | Hexene | Hexene |
| Catalyst Prod (lb/lb) | 3850 | 3850 | 3850 | 3850 | 3850 |
| Cx/C2 | 0.0157 | 0.0157 | 0.0157 | 0.0157 | 0.0157 |
| H2/C2 mole/mole | — | — | — | — | — |
| mole ppm/mole | 2.4 | 2.4 | 2.4 | 2.4 | 2.4 |
| Ethylene (mol %) | 39.8 | 39.8 | 39.8 | 39.8 | 39.8 |
| Nitrogen (mol %) | 37.6 | 21.1 | 41.9 | 51.6 | 49.9 |
| Hexene (mol %) | 0.6 | 0.6 | 0.6 | 0.6 | 0.6 |
| Hydrogen (mol %) | 0.010 | 0.010 | 0.010 | 0.010 | 0.010 |
| Condensible | Isopentane | Isobutane | Pentane | Hexane | Isohexane |
| Cond Conc (mol %) | 21.1 | 40.2 | 15.7 | 5.8 | 7.5 |
| Prod Rate (lb/hr) | 131400 | 187709 | 113500 | 70840 | 78760 |
| Prod Rate (tons/hr) | 59.7 | 85.3 | 51.6 | 32.2 | 35.8 |
| % Cond | 30.59 | 41.80 | 25.68 | 13.90 | 16.78 |
| T inlet (°C.) | 40.6 | 40.6 | 40.6 | 40.7 | 40.5 |
| T inlet (°F.) | 105.0 | 105.0 | 105.0 | 105.2 | 104.9 |
| T dew (°C.) | 73.4 | 73.3 | 73.2 | 73.2 | 73.2 |
| T dew (°F.) | 164.2 | 164.0 | 163.7 | 163.8 | 163.8 |
| Gas Density (lb/ft$^3$) | 1.93 | 2.06 | 1.80 | 1.57 | 1.63 |
| Gas Density (kg/m$^3$) | 30.9 | 32.9 | 28.9 | 25.2 | 26.0 |
| Specific Enthalpy (Btu/lb) | 73.5 | 80.0 | 67.9 | 48.4 | 52.1 |
| Specific Enthalpy (cal/g) | 40.8 | 44.4 | 37.7 | 26.9 | 28.9 |

While the present invention has been described and illustrated by reference to particular embodiments thereof, it will be appreciated by those of ordinary skill in the art that the invention lends itself to variations not necessarily illustrated herein. For example, it is not beyond the scope of this invention to reduce the temperature of a recycle stream by employing refrigerator units or operating two or more reactors in series with the same or different catalyst. For this reason, then, references should be made solely to the appended claims for purposes of determining the true scope of the present invention.

What is claimed is:

1. A continuous gas phase polymerization process comprising copolymerizing an alpha-olefin monomer with at least one other alpha-olefin comonomer in the presence of a silica-supported metallocene catalyst in a gas phase fluidized bed reactor operating in a condensed mode, said process further comprises a recycle stream passing through a fluidized bed in said reactor wherein the recycle stream comprises a dew point increasing component in an amount greater than 2.0 mole percent.

2. The process in accordance with claim 1 wherein said recycle stream composition is maintained at a ratio of $C_x/C_y$ of less than 0.2, where $C_x$ and $C_y$ are the mole percent respectively of comonomer and monomer.

3. The process in accordance with claim 2 wherein the recycle stream further comprises hydrogen (H$_2$) in a mole ratio of $H_2/C_y$ of less than 0.01.

4. The process in accordance with claim 1 wherein the silica-supported metallocene catalyst system comprises an alumoxane or an ionic activator.

5. The process in accordance with claim 1 wherein the weight percent of liquid based on the total weight of the recycle stream is greater than 5 weight percent to about 50 weight percent.

6. A continuous process for the polymerization of alpha-olefin monomer and at least one copolymerizable alpha-olefin comonomer in a gas phase fluidized bed reactor, said process comprising the steps of:
 a) passing a recycle stream through said reactor, said recycle stream comprising monomer, comonomer and hydrogen in a ratio of $(C_x+H_2)/C_y$ of less than 0.2, where $C_x$, $H_2$ and $C_y$ are the mole percent respectively of comonomer, hydrogen and monomer, said recycle stream further comprising a dew point increasing component in an amount greater than 2.0 mole percent and optionally, a non-condensable inerts making up the balance of said recycle stream;
 b) introducing a polymerization catalyst into said reactor, the polymerization catalyst comprising a metallocene catalyst system supported on a particulate material comprising silica;
 c) withdrawing said recycle stream from the reactor;
 d) cooling said recycle stream to form a liquid and a gas phase;
 e) introducing into said recycle stream additional monomers to replace monomers polymerized to maintain said ratio of said recycle stream;
 f) reintroducing said liquid and gas phase into said reactor; and
 g) withdrawing said polymer product from said reactor.

7. The process in accordance with claim 6 wherein the monomer and comonomer are alpha-olefins having from 2 to 15 carbon atoms.

8. The process in accordance with claim 6 wherein the catalyst has a reactivity ratio of less than 2.

9. The process in accordance with claim 6 wherein the catalyst productivity is greater than 2000 grams of polymer per gram of said catalyst.

10. The process in accordance with claim 6 wherein the mole percent of alpha-olefin monomer is from about 25 to 75 mole percent.

11. The process in accordance with claim 6 wherein the monomer partial pressure is in the range of from about 70 psia (482.8 kPaa) to about 240 psia (1655.2 kPaa).

12. The process in accordance with claim 6 wherein the mole ratio of $H_2/C_y$ is less than 0.01.

13. The process in accordance with claim 6 wherein said recycle stream contains about 5 to about 60 mole percent of said dew point increasing component.

14. The process in accordance with claim 6 wherein the total weight percent of liquid based on the total weight of the recycle stream is greater than 2.5 weight percent.

15. The process in accordance with claim 6 wherein the dew point increasing component has at least one carbon less than the comonomer.

16. The process in accordance with claim 6 wherein said ratio is less than about 0.1.

17. The process in accordance with claim 6 wherein the liquid and the gas phases are introduced separately into the reactor.

18. The process in accordance with claim 6 wherein the polymer product having a density less than 0.910 g/cm$^3$.

19. The process in accordance with claim 6 wherein the polymer product having a melt index greater than 3 dg/min.

20. The process in accordance with claim 6 wherein the polymer product having a density greater than 0.910 g/cm$^3$.

21. The process in accordance with claim 6 wherein the polymer product having a melt index greater than 100 dg/min.

22. In a gas fluidized bed polymerization process for polymerizing alpha-olefins comprising, passing a recycle stream comprising a monomer and at least one comonomer through a fluidized bed reactor, withdrawing a polymeric product and a recycle stream comprising unreacted monomers, introducing into said recycle stream additional monomers to replace monomers polymerized and withdrawn, compressing and cooling said recycle stream to form a gas and a liquid phase and reintroducing said gas phase and said liquid phase into said reactor, the improvement comprising: maintaining the recycle stream at a monomer concentration in the range of from about 10–20 to about 80–90 mole percent, employing a silica-supported catalyst system comprising a metallocene catalyst and as the cocatalyst alumoxane or an ionic activated complex and passing the recycle stream through a fluidized bed in said reactor wherein the recycle stream further comprises a dew point increasing component in an amount greater than 2.0 mole percent.

23. The process in accordance with claim 22 wherein the recycle stream further comprises hydrogen in a concentration in amount from about 10 ppm to about 10,000 ppm.

24. The process in accordance with claim 22 wherein the recycle stream further comprises nitrogen in amount from about 5 to about 50 mole percent.

25. The process in accordance with claim 22 wherein the recycle stream further comprises a dew point increasing component in amount from about 5 to about 50 mole percent.

26. The process in accordance with claim 22 wherein the liquid phase in said recycle stream is greater than about 5 to 40 weight percent based on the total weight of the recycle stream.

27. The process in accordance with claim 22 wherein said polymer product has a CDBI greater than 50 percent.

28. The process in accordance with claim 22 wherein the polymer product produced has a density in the range of from 0.850 g/cm$^3$ to 0.970 g/cm$^3$.

29. The process in accordance with claim 28 wherein said polymer product has a melt index of at least 0.01 dg/min and less than 1000 dg/min.

30. The process in accordance with claim 22 wherein said monomers are alpha-olefin monomers having from 2 to 20 carbon atoms.

31. The process in accordance with claim 30 wherein said monomers are $C_4$ and $C_2$ alpha-olefins in the ratio of from about 0.001 to about 0.2.

32. The process in accordance with claim 30 wherein said monomers are $C_5$ and $C_2$ alpha-olefins in the ratio of from about 0.001 to about 0.15.

33. The process in accordance with claim 30 wherein said monomers are $C_6$ and $C_2$ alpha-olefins in the ratio of from about 0.001 to about 0.1.

34. The process in accordance with claim 30 wherein said monomers are $C_8$ and $C_2$ alpha-olefins in the ratio of from about 0.001 to about 0.05.

* * * * *

(12) EX PARTE REEXAMINATION CERTIFICATE (5047th)
United States Patent
DeChellis et al.

(10) Number: US 5,405,922 C1
(45) Certificate Issued: Dec. 28, 2004

(54) PROCESS FOR POLYMERIZING MONOMERS IN FLUIDIZED BEDS

(75) Inventors: Marc L. DeChellis, Houston, TX (US); John R. Griffin, Baytown, TX (US); Michael E. Muhle, Kingwood, TX (US)

(73) Assignee: Exxon Chemical Patents Inc., Wilmington, DE (US)

Reexamination Request:
No. 90/004,248, May 21, 1996
No. 90/004,574, Mar. 5, 1997

Reexamination Certificate for:
Patent No.: 5,405,922
Issued: Apr. 11, 1995
Appl. No.: 08/216,520
Filed: Mar. 22, 1994

Related U.S. Application Data

(63) Continuation of application No. 08/065,250, filed on May 20, 1993, now abandoned.

(51) Int. Cl.$^7$ .................................. C08F 2/34
(52) U.S. Cl. ................... 526/68; 526/160; 526/348.2
(58) Field of Search ........................ 526/67, 68, 70, 526/88, 130, 160, 348.2, 348.4, 348.5, 901

(56) References Cited

U.S. PATENT DOCUMENTS

| | | | |
|---|---|---|---|
| 4,588,790 A | * | 5/1986 | Jenkins, III et al. .......... 526/70 |
| 4,791,180 A | | 12/1988 | Turner |
| 4,808,561 A | | 2/1989 | Welborn, Jr. |
| 4,877,587 A | * | 10/1989 | Rhee et al. .................... 526/68 |
| 4,921,825 A | * | 5/1990 | Kioka et al. ............ 526/160 X |
| 4,937,301 A | | 6/1990 | Chang |
| 5,017,665 A | * | 5/1991 | Chang ........................ 526/336 |
| 5,240,894 A | | 8/1993 | Burkhardt et al. |

FOREIGN PATENT DOCUMENTS

EP 336593 * 10/1989

OTHER PUBLICATIONS

"Exxon Devotes PE Unit to Exxpol Catalyst Tech.," European Chemical News Apr. 6, 1992, vol. 57, No. 1514, p. 27.

"Exxon/Mitsui Sign R&D Deal For SSC Process," European Chemical News Apr. 27, 1992, vol. 57, No. 1517, p. 24.

"The Polyolefin Revolution—New Catalysts Pave Way for Differentiation," Chemical Week, May 13, 1992, pp. 52–53.

* cited by examiner

Primary Examiner—Fred Teskin

(57) ABSTRACT

The invention is directed toward polymerizing alpha-olefins either alone or in combination with one or more other alpha-olefins utilizing a bulky ligand transition metal catalyst in a gas phase fluidized bed polymerization reactor operating in condensed mode.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–34 is confirmed.

* * * * *